United States Patent
Rivett et al.

(10) Patent No.: US 7,365,130 B2
(45) Date of Patent: Apr. 29, 2008

(54) CYCLOOLEFINIC COPOLYMER FOR HIGH MODULUS FILM

(75) Inventors: Janet W. Rivett, Simpsonville, SC (US); Nathanael Rustia Miranda, Spartanburg, SC (US); Kelly Ray Ahlgren, Greenville, SC (US)

(73) Assignee: Cryovac, Inc., Duncan, SC (US)

( * ) Notice: Subject to any disclaimer, the term of this patent is extended or adjusted under 35 U.S.C. 154(b) by 142 days.

(21) Appl. No.: 10/766,753

(22) Filed: Jan. 28, 2004

(65) Prior Publication Data

US 2004/0236024 A1 Nov. 25, 2004

Related U.S. Application Data

(60) Provisional application No. 60/443,015, filed on Jan. 28, 2003.

(51) Int. Cl.
*C08L 45/00* (2006.01)
*C08L 9/00* (2006.01)
*C08L 23/00* (2006.01)
*C08L 23/04* (2006.01)
*C08L 23/10* (2006.01)
*C08L 25/02* (2006.01)

(52) U.S. Cl. .................... 525/191; 525/210; 525/232; 525/240; 525/241

(58) Field of Classification Search .......... 525/191, 525/210, 232, 240, 241; 524/431, 81, 86, 524/87, 89, 90, 107, 432, 847
See application file for complete search history.

(56) References Cited

U.S. PATENT DOCUMENTS

| | | |
|---|---|---|
| 4,166,083 A | 8/1979 | Ueda et al. |
| 4,918,133 A | 4/1990 | Moriya et al. |
| 4,948,856 A | 8/1990 | Minchak et al. |
| 4,992,511 A | 2/1991 | Yamamoto et al. |
| 5,180,767 A | 1/1993 | Sakai et al. |
| 5,218,049 A | 6/1993 | Yamamoto et al. |
| 5,331,057 A | 7/1994 | Brekner et al. |
| 5,359,001 A | 10/1994 | Epple et al. |
| 5,468,803 A | 11/1995 | Takahashi et al. |
| 5,468,819 A | 11/1995 | Goodall et al. |
| 5,475,060 A | 12/1995 | Brekner et al. |
| 5,552,504 A | 9/1996 | Bennett et al. |
| 5,561,208 A | 10/1996 | Takahashi et al. |
| 5,569,730 A | 10/1996 | Goodall et al. |
| 5,571,881 A | 11/1996 | Goodall et al. |
| 5,646,220 A | 7/1997 | Brekner et al. |
| 5,741,869 A | 4/1998 | Goodall et al. |
| 5,750,815 A | 5/1998 | Grubbs et al. |
| 5,783,273 A | 7/1998 | Yamamoto et al. |
| 5,831,108 A | 11/1998 | Grubbs et al. |
| 5,854,349 A * | 12/1998 | Abe et al. .................. 525/98 |
| 5,863,986 A | 1/1999 | Herrmann-Schonherr et al. |
| 5,929,181 A | 7/1999 | Makovetsky et al. |
| 5,942,587 A | 8/1999 | Arjunan et al. |
| 6,008,298 A | 12/1999 | Hatke et al. |
| 6,090,888 A | 7/2000 | Khanarian et al. |
| 6,165,573 A | 12/2000 | Hirose et al. |
| 6,255,396 B1 | 7/2001 | Ding et al. |
| 6,297,322 B1 | 10/2001 | Ding et al. |
| 2002/0128392 A1* | 9/2002 | Zen et al. .................. 525/216 |

FOREIGN PATENT DOCUMENTS

| | | |
|---|---|---|
| EP | 0 335 985 | 11/1989 |
| EP | 0 649 737 A1 | 4/1995 |
| EP | 0 726 291 A1 | 8/1996 |
| EP | 0 995 776 A | 4/2000 |
| JP | 3-054220 | 3/1991 |
| JP | 3-112646 | 5/1991 |
| JP | 5-247324 | 9/1993 |

OTHER PUBLICATIONS

Khanarian, G., "Rubber Toughened And Optically Transparent Blend Of Cyclic Olefin Copolymers," *Polymer Engineering and Science*, vol. 40, No. 12, pp. 2590-2601, Dec. 2000.
Brock et al., "TOPAS: Cyclo-Olefin Copolymers," *MetCon 98: "Polymers in Transition*," Jun. 10-11, 1998, Houston, TX.
TOPAS (COC) Polymer Materials, *Hoechst High Chem.*, pp. 1-16, Nov. 1995.

* cited by examiner

*Primary Examiner*—Nathan M. Nutter
(74) *Attorney, Agent, or Firm*—Alston & Bird LLP (57) ABSTRACT

Cycloolefinic polymer compositions exhibiting an advantageous balance of dimensional stability, improved impact resistance and superior optical properties are provided. The cycloolefinic polymer compositions of the invention generally include at least one cycloolefinic polymer and an effective amount of an elastomeric copolymer having an aromatic vinyl content of from 14 to 39 weight percent. The cycloolefinic polymer compositions may be incorporated into a variety of products, including multilayer films.

13 Claims, 3 Drawing Sheets

CYCLOOLEFINIC COPOLYMER FOR HIGH MODULUS FILM

CROSS REFERENCE TO RELATED APPLICATIONS

This application is related to commonly owned copending Provisional Application Ser. No. 60/443,015, filed Jan. 28, 2003, incorporated herein by reference in its entirety, and claims the benefit of its earlier filing date under 35 U.S.C. 119(e).

FIELD OF THE INVENTION

The invention relates to flexible, high modulus polymeric films. The invention more particularly relates to high modulus polymeric films exhibiting desirable optical and impact properties formed from cycloolefinic copolymer compositions.

BACKGROUND OF THE INVENTION

Polymeric films are used in a wide variety of packaging applications, including food packaging, pharmaceutical products and non-perishable consumer goods. Films suitable for each of these applications are typically required to exhibit a range of physical properties. Food packaging films in particular may be required to meet numerous demanding performance criteria, depending on the specific application. Exemplary performance criteria include outstanding dimensional stability, i.e. a high modulus at both room and elevated temperatures, superior impact resistance, especially at low temperatures, and good transparency.

Horizontal and vertical form-fill-seal processes (HFFS and VFFS, respectively) are particularly rigorous food packaging applications. HFFS is commonly used to form flexible packaging for hot dogs, lunch meats and the like. In HFFS packaging, foodstuffs are introduced into multiple container-like pockets that have been formed across the width of a continuous roll of film ("the forming film"). The pockets are initially thermoformed and then filled as the forming film is continuously transported down a single production line. A second film ("the non-forming film") is unwound and superposed over the forming film after it has been filled. The two films are then heat sealed at the flat surfaces surrounding the perimeter of each of the forming film pockets. The sealed pockets are then severed at the bonded flat surface, thus forming a final product suitable for sale.

The non-forming film protects the foodstuff in the forming film pockets and is also typically used to identify the product. The non-forming film is thus generally printed with labeling and the like. If the non-forming film lacks adequate dimensional stability the package may become distorted during either the heat sealing, unwinding, or severing processes. Heat sealing processes are especially demanding because they commonly involve drawing a vacuum around the foodstuffs and/or sealing foodstuffs protruding above the forming film pocket. Elevated temperatures are typically used to ensure an adequate bond between the forming and non-forming films, further exacerbating the potential for film deformation. Deformed forming films may stretch and conform to the shape of the product rather than bridging the contours of the foodstuff, distorting the product labeling.

Outstanding dimensional stability is also required for VFFS packaging films used with "hot fill" products, such as soups, sauces, jellies, beverages and other liquefied foods. In hot fill VFFS, flowable foodstuffs at elevated temperatures are introduced through a central, vertical fill tube and into a formed tubular film that has been heat-sealed transversely at its lower end. After being filled, the package, in the form of a pouch, is completed by transversely heat-sealing the upper end of the tubular segment, and severing the pouch from the tubular film above it, usually by applying sufficient heat to melt through the tube above the newly formed upper heat-seal. If the film from which the VFFS package is made does not have sufficient dimensional stability, the package may become distorted either from the heated product or the heat-sealing.

Dimensional stability, particularly high temperature dimensional stability, is also desirable in lidding stock for semi-rigid and rigid containers. Lidding films are commonly used in conjunction with semi-rigid vacuum and/or gas-flushed packages for meat and poultry contained in a foam or other semi-rigid type tray. Lidding films may also be used in rigid packaging constructions, such as packaging for yogurt, custard and other dairy products contained in a rigid cup-like container. When lidding films are applied to such semi-rigid and rigid packages, heat is generally used to seal the film to the container, tray, or cup in which the product is contained. Without sufficient high temperature dimensional stability, the lidding films can stretch during the lidding process, resulting in distorted printed images on the films.

As mentioned above, non-forming films are commonly printed with labeling information. Films exhibiting superior dimensional stability at elevated temperatures are also beneficial in printing processes. Maintenance of color-to-color registration on the printing press is important, as is overall consistency of the "repeat length" of each printed image. Drying tunnel temperatures commonly reach temperatures of 200° F. (93° C.). Films having sufficient resistance to stretching, necking and other types of deformation at elevated temperatures are desirable, so that registration is not lost and the repeat length of the images are consistently maintained on downstream packaging equipment.

Cycloolefinic polymers are known to exhibit outstanding dimensional stability, particularly at elevated temperatures. Cycloolefinic polymers also provide superior optical properties. Cycloolefinic polymers are generally described in numerous United States patents, including U.S. Pat. Nos. 4,948,856; 5,331,057 and 5,468,819. Unfortunately, cycloolefinic polymers are brittle, resulting in poor impact resistance. The impact strength of cycloolefinic polymers can be improved by blending the cycloolefinic polymer with elastomeric copolymers, particularly elastomeric copolymers derived from aromatic vinyl. Cycloolefinic resins incorporating elastomeric resins derived from aromatic vinyl are described in U.S. Pat. Nos. 6,090,888; 4,918,133; 4,992,511; 5,218,049 and EP 726,291. Unfortunately, elastomeric copolymers, including those derived from aromatic vinyl, typically reduce the optical properties of the resulting resin to unacceptable levels.

Attempts have been made to improve the optical properties of impact resistant cycloolefinic compositions. The use of matched refractive indices in resin components is generally known to reduce haze. Consequently, resin suppliers generally recommend the elastomeric copolymers having refractive indices matching that of the cycloolefinic polymer. U.S. Pat. No. 6,090,888 discloses the use of elastomers having refractive indices within 0.05 of the cycloolefinic polymer, for example. By matching refractive indices, cycloolefinic resins exhibiting a haze of 10% or lower have been produced, but such optically acceptable resins are further characterized by inferior impact resistance. Consequently, although intuitively appealing, the use of matched refractive indices has yet to provide cycloolefinic resin compositions providing both acceptable optical properties and impact resistance.

BRIEF SUMMARY OF THE INVENTION

The present invention generally relates to compositions that can exhibit a useful balance of properties, such as acceptable impact resistance and optical qualities. The polymer compositions of the invention include at least one cycloolefinic polymer. The polymer compositions of the invention further include at least one elastomeric aromatic vinyl based block copolymer. The elastomeric copolymers have an aromatic vinyl content of from 14 to 39 weight percent, and can have an aromatic vinyl content of from 20 to 35 weight percent. Elastomeric copolymers that include an aromatic vinyl content of from 14 to 39 weight percent can provide an unexpected balance of optical properties and impact resistance to the cycloolefinic polymer composition, for example, haze values of 40% or less and peak impact energies of 0.05 joules or greater.

The cycloolefinic polymers can be homopolymers or copolymers of any cyclic olefin monomers as known in the art. Exemplary cyclic olefin monomers include without limitation norbornene, tetracyclododecene, bicyclo[2,2,1]hept-2-ene, 1-methylbicyclo[2,2,1]hept-2-ene, hexacyclo[$6,6,1,1^{3,6},1^{10,13},0^{2,7},0^{9,14}$]-4-heptadecene, and combinations thereof. The cycloolefinic polymer can also include one or more mer units derived from at least one acyclic monomer, including without limitation ethylene, propylene, and combinations thereof. An exemplary cycloolefinic polymer is a copolymer of norbornene and ethylene.

The glass transition temperature (Tg) of cycloolefinic copolymers can be adjusted by varying the ratio of cyclic olefin monomer to acyclic monomer within the copolymer, with higher amounts of cyclic olefin monomer increasing the resulting glass transition temperature. Higher glass transition polymers can provide greater dimensional stability at elevated temperatures. Products including cycloolefinic copolymers with a higher Tg can therefore exhibit the added benefit of an extended sealing temperature range. As a result, increased thermal energy can be applied to a product with a higher Tg cycloolefinic copolymer as a component during sealing with minimal or no adverse affects, such as film elongation or stretching, rupture and the like. Cycloolefinic copolymers suitable for use in the invention generally exhibit a glass transition ranging from 70 to 200° C., including cycloolefinic copolymers with a glass transition temperature ranging from 100 to 180° C., and from 140 to 160° C.

The elastomeric copolymer of the composition of the invention includes at least one aromatic vinyl mer unit, such as that derived from styrene, vinyl toluene and t-butyl styrene monomers. The elastomeric copolymer of the invention also includes at least one saturated alkene mer unit, such as that derived from ethylene, propylene, butylene, partially hydrogenated butadiene and partially hydrogenated isoprene monomers. Exemplary non-limiting elastomeric copolymers include styrene-ethylene-butylene-styrene and styrene-propylene-styrene.

The cycloolefinic polymer compositions may be incorporated into a variety of products, including mono- and multilayer films. The multilayer films of the invention further include one or more additional layers, such as but not limited to one or more heat seal layers, oxygen barrier layers, printable layers, abuse layers, tie layers, anti-curl layers, and adhesive layers. The cycloolefinic composition can also be used in other articles such as molded articles, pultruded articles, stamped articles, composite articles, and the like.

The present invention also provides methods of making film including the cycloolefinic polymer composition of the invention. The film is generally formed by extruding the polymer composition through a heated die to form a layer, and optionally coextruding the resultant film layer with at least one additional layer.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
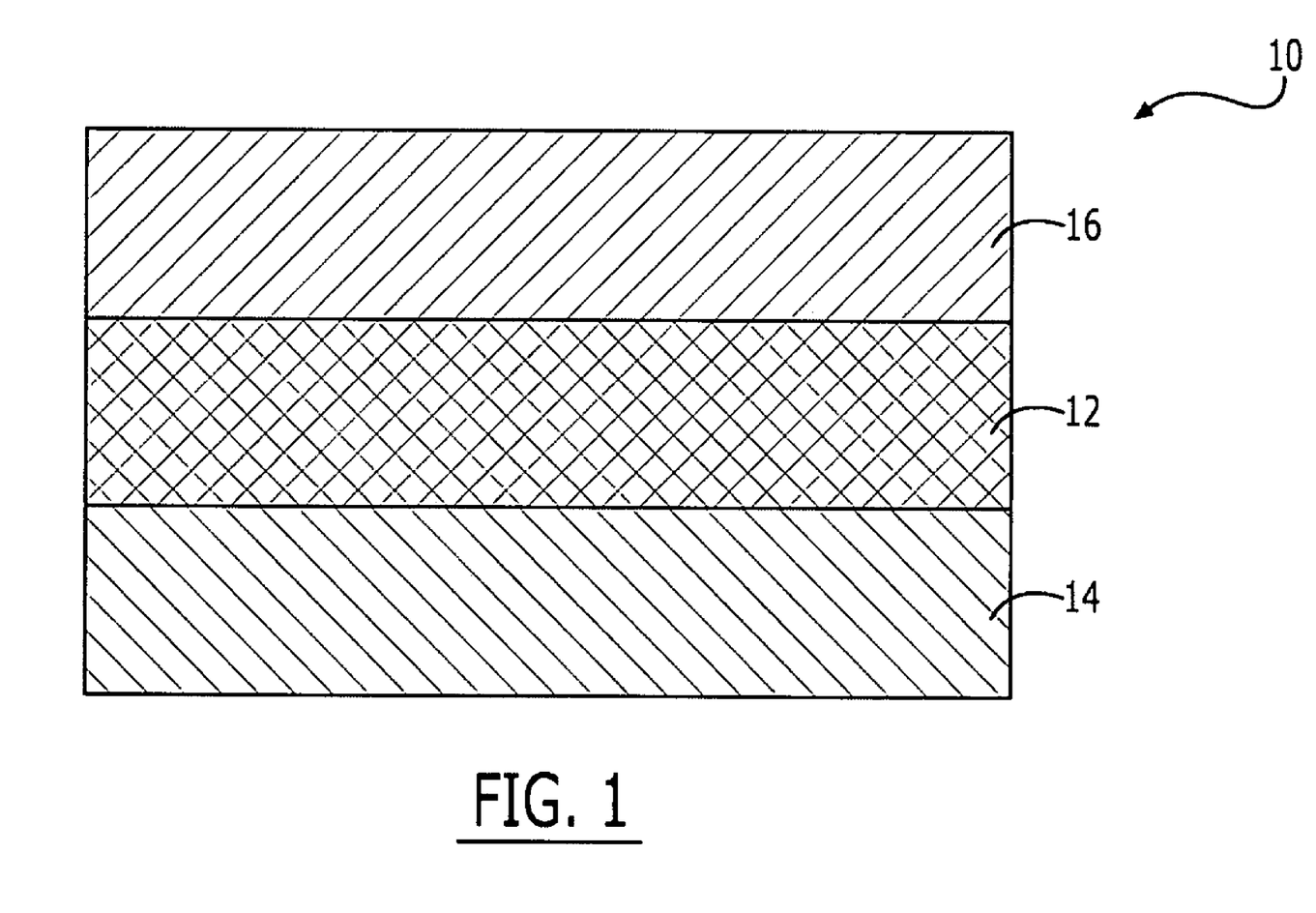
FIG. 1 is a schematic cross-sectional view of a multilayer film in accordance with one embodiment of the present invention.

FIG. 1 provides a schematic cross-sectional view of a multilayer film formed in accordance with one aspect of the invention. As shown in FIG. 1, the multilayer film 10 generally includes a high modulus layer 12 formed from a high modulus composition sandwiched between a heat-seal layer 14 and an optional oxygen barrier layer 16.

The application describes the invention as a multilayer construction. However, the high modulus composition may be used alone as either a monolayer film or as a molding composition in alternative aspects of the invention. As used herein, the term "film" is used in its generic sense to include a plastic web, regardless of whether it is film or sheet, and can include a film, laminate, sheet, web, coating, or the like. The film can be used as a component in a rigid, semi-rigid, or flexible product, and can be adhered to another polymeric substrate and/or to a non-polymeric or non-thermoplastic substrate such as paper or metal. Molding compositions of the invention may subsequently be used in any type of extrusion molding, such as T-die and inflation processes, blow molding, such as direct blow molding and injection blow molding, press molding, injection molding and stamping. The high modulus compositions of the invention may further be used to form composites or composite laminates together with other materials.

The high modulus composition forming the high modulus layer 12 generally includes at least one cycloolefinic polymer and at least one elastomeric copolymer. As used herein, the term "polymer" includes both homopolymers and copolymers, unless specified to the contrary. As further defined herein, the terms "cycloolefinic" and "cyclic olefin"

are synonymous and will thus be used interchangeably throughout the remainder of the application.

Suitable cycloolefinic polymers include homopolymers or copolymers of any cyclic olefin monomers known in the art. Exemplary cycloolefinic polymers are described in U.S. Pat. Nos. 5,008,356; 6,090,888 and European Patent Application EP 0 726 291 A1 the contents of which are hereby incorporated by reference. Non-limiting examples of suitable cyclic olefin monomers include norbornene, tetracyclododecene, bicyclo[2,2,1]hept-2-ene, 1-methylbicyclo[2,2,1]hept-2-ene, hexacyclo [$6,6,1,1^{3,6},1^{10,13},0^{2,7},0^{9,14}$]-4-heptadecene, and the like, and combinations thereof.

Suitable cycloolefinic copolymers may be formed from one or more of the cyclic olefins described above and one or more acyclic monomers, such as acyclic olefin monomers. Non-limiting exemplary acyclic olefin monomers include ethylene, propylene and the like, as well as mixtures thereof. In advantageous embodiments, the cycloolefinic polymer is a copolymer of norbornene and ethylene. Suitable commercially available cycloolefinic polymers include metallocene catalyzed cycloolefinic polymers, particularly cycloolefinic polymers catalyzed by $C_2$- and $C_s$-symmetric metallocenes, such as the TOPAS® series of cycloolefinic polymers from Ticona Corp. of Summit, N.J. Exemplary TOPAS® resins include but are not limited to TOPAS® 6013 and TOPAS® 6015 cycloolefinic copolymers. Alternative suitable commercially available cycloolefinic polymers include cycloolefinic polymers formed via ring opening polymerization, such as the ZEONOR® line from Nippon Zeon Chemical Corp. of Japan, such as ZEONOR® 1020 and ZEONOR® 1420.

The glass transition temperature of cycloolefinic copolymers may be adjusted by varying the ratio of cyclic olefin monomer to acyclic monomer within the copolymer, with higher amounts of cyclic olefin monomer increasing the resulting glass transition temperature. Higher glass transition polymers are generally thought to provide greater dimensional stability at elevated temperatures. Consequently, cyclic olefins suitable for use in the invention generally exhibit a glass transition temperature ranging from 70 to 200° C., such as cycloolefinic copolymers exhibiting a glass transition temperature ranging from 100 to 180° C. and from 140 to 160° C. Consequently, the cycloolefinic copolymer typically contains from 25 to 65 mol % cyclic olefin. In one aspect of this embodiment, the cycloolefinic copolymer contains approximately 50 mol % cyclic olefin.

The cycloolefinic polymer may be present within the high modulus polymer composition in any amount effective to provide adequate dimensional stability to the resulting polymer composition. For example, the cycloolefinic polymer may generally be present within the high modulus polymer composition in amounts of from 25 to 98 weight percent, based on the weight of the high modulus polymer composition ("bohm"). Particular film formation methods may advantageously incorporate more specific ranges of amounts of the cycloolefinic copolymer within the high modulus polymer composition. For example, in exemplary aspects of the invention directed to cast films, the cycloolefinic polymer may be included within the high modulus polymer composition in amounts of from 50 to 90 weight percent, such as an amount of from 50 to 70 weight percent, bohm. Alternatively, in exemplary aspects of the invention directed to blown films, the cycloolefinic polymer may be included within the high modulus polymer composition in amounts of from 50 to 80 weight percent, such as an amount of from 60 to 70 weight percent, bohm.

The high modulus polymer composition further includes at least one elastomeric copolymer. Elastomeric copolymers are generally comprised of alternating soft and hard segments. Useful elastomeric copolymers include non-halogenated block copolymers having hard segments formed from one or more aromatic vinyl monomers and saturated hydrocarbon soft segments formed from one or more alkenes. As used herein, the term "saturated" means that the hydrocarbon contains only single bonds following its incorporation into the elastomeric copolymer. Exemplary aromatic vinyl monomers include styrene, vinyl toluene, t-butyl styrene and mixtures thereof. Exemplary alkenes include ethylene, propylene, butylene (including butene-1, cis-butene-2, trans-butene-2, isobutene), and mixtures thereof. The alkenes may be either linear or branched. Suitable elastomeric copolymers include, but are not limited to, styrene-ethylene-butylene-styrene ("SEBS") elastomers, styrene-ethylene-propylene-styrene ("SEPS") elastomers, and mixtures thereof. Elastomeric copolymers suitable for use in the invention are commercially available from a number of suppliers, such as the line of KRATON elastomers from Kraton Inc., Houston, Tex.; K-Resin from Chevron-Phillips, and VECTOR from Dexco Polymers. The average particle size of the elastomeric particles in the high modulus polymer composition typically ranges from 0.2-2 microns.

Although not wishing to be bound by theory, Applicants have found that more flexible elastomeric copolymers, i.e. elastomeric copolymers including lower amounts of vinyl aromatic monomer, produce high modulus polymer compositions exhibiting a beneficial balance of dimensional stability, impact resistance and superior optical properties. The invention provides high modulus polymer compositions that can exhibit modulus values of greater than 200,000 psi, peak energies of 0.05 joules or greater, and haze values of 40% or less. For example, the compositions of the invention can exhibit peak energy values of 0.06 joules or greater; 0.07 joules or greater; 0.08 joules or greater; 0.10 joules or greater; 0.30 joules or greater; and 1.0 joules or greater. Also as an example, the compositions of the invention can exhibit haze values of 30% or less; 20% or less; and 10% or less. An exemplary high modulus polymer composition of the invention can, for example, exhibit a modulus of 342 kpsi, peak energies of 0.07 joules or greater, and haze values of 10% or less.

Heretofore, it has been believed that the optical properties of impact resistant cycloolefinic copolymers would be improved by matching the refractive indices of the cycloolefinic polymer and the elastomeric component. Significant amounts of vinyl aromatic monomer are required within elastomeric components to match the refractive indices of cycloolefinic copolymers. For example, SEBS elastomer having 60 weight percent styrene has been recommended to decrease the haze in cycloolefinic polymer compositions. Although providing acceptable optical properties, the impact resistance of compositions containing such high amounts of aromatic monomer was not acceptable. Consequently, cycloolefinic polymers have been precluded from many end uses, such as food packaging and the like.

Although not wishing to be bound by theory, Applicants hypothesize that, in contrast to conventional wisdom, elastomeric copolymers exhibiting refractive indices differing from those of the cycloolefinic copolymers provide a heretofore unknown and highly beneficial balance of optical properties and impact resistance. Cycloolefinic copolymer/elastomeric copolymer combinations exhibiting a difference in refractive index of 0.03, such as a difference of 0.05 or 0.065, may exhibit such an advantageous balance of properties, for example.

Applicants have found that elastomeric copolymers that include a lesser amount of aromatic vinyl monomer, such as amount of from 14 to 39 weight percent (based on the weight of the elastomeric copolymer, "boec"), can provide an altogether unexpected balance of superior optical properties and improved impact resistance within the resulting cycloolefinic polymer composition. For example, elastomeric copolymers that include from to 20 to 35 weight percent (boec) vinyl aromatic monomer, such as an amount of 25 to 32 weight percent (boec) vinyl aromatic monomer, can provide a beneficial balance of superior optical properties and acceptable impact resistance within the resulting cycloolefinic polymer composition. Applicants have determined that elastomeric copolymers that contain 29 weight percent (boec) vinyl aromatic monomer can provide an exceptional balance of optical properties, impact resistance and dimensional stability.

Elastomers containing specific amounts of aromatic vinyl may be obtained directly from a resin supplier. For example, KRATON® G1652 contains 29% styrene. Elastomers containing a particular amount of aromatic vinyl monomer may also be prepared by blending different elastomers in suitable proportions to arrive at a new elastomeric composition containing a monomer ratio different from the starting materials.

Applicants have further determined that appropriate quantities of the elastomeric copolymer can impart a host of beneficial properties to the resulting high modulus polymer composition. Applicants have determined that the presence of excessive amounts of elastomeric copolymer within the high modulus polymer composition can decrease the optical properties to unacceptable levels. Conversely, the presence of insufficient amounts of the elastomeric copolymer within the high modulus polymer composition can detrimentally affect film formation within certain manufacturing processes or detrimentally affect the performance of the film during the packaging process.

The elastomeric copolymer is thus generally present within the high modulus resin composition in amounts of from 2 to 75 weight percent, based on the weight of the high modulus polymer composition ("bohm"). Particular film formation methods may advantageously incorporate more specific ranges of amounts of the elastomeric copolymer within the high modulus polymer composition. For example, in exemplary aspects of the invention directed to cast films, the elastomeric copolymer may beneficially be included within the high modulus polymer composition in amounts of from 10 to 50 weight percent, such as an amount of from 30 to 50 weight percent, bohm. Alternatively, in exemplary aspects of the invention directed to blown films, the cycloolefinic polymer may beneficially be included within the high modulus polymer composition in amounts of from 20 to 50 weight percent, such as an amount of from 30 to 40 weight percent, bohm.

The high modulus polymer composition is generally prepared by combining the cycloolefinic polymer with the elastomeric copolymer by standard procedures. For example, the high modulus polymer composition may be compounded in an extruder. The specific compounding conditions would be selected according to the nature of the materials chosen, as is well known to those with ordinary skill in the art. For example, the elastomeric copolymer and cycloolefinic polymer may be introduced in suitable amounts and ratios into a compounding extruder such as, for example a twin screw extruder from Leistritz. The elastomeric copolymer and cycloolefinic polymer are then compounded/extruded at suitable temperatures and rotating speeds and formed into pellets. The pellets may then be introduced into further extrusion or molding equipment, such as a film extruder. Such techniques, including selection of compounding conditions, are well known to those skilled in the art. Alternatively, the high modulus polymer composition may be formed by dry blending the cycloolefinic polymer with the elastomeric copolymer.

Although providing numerous benefits, films that are dimensionally stable, particularly at high temperatures, do not soften sufficiently to provide heat bonding characteristics. Consequently, the multilayer film 10 generally includes a heat-seal layer 14 comprising a material that is capable of forming a heat seal. The heat-seal layer 14 is an exterior layer of the multilayer film 10. As used herein, the phrase "exterior layer" refers to any layer of a multilayer film having only one of its principal surfaces directly adhered to another layer of that film.

As used herein, the term "heat-seal" refers to the union of two films by bringing the films into contact, or at least close proximity, with one another and then applying sufficient heat and pressure to a predetermined area (or areas) of the films to cause the contacting surfaces of the films in the predetermined area to become molten and intermix with one another, thereby forming an essentially inseparable bond between the two films in the predetermined area when the heat and pressure are removed therefrom and the area is allowed to cool.

Examples of suitable materials used to form the heat-seal layer 14 include ionomers (e.g., SURLYN from DuPont), heterogeneous (Zeiger-Natta catalyzed) ethylene/alpha-olefin copolymer such as linear low density polyethylene, homogeneous (metallocene or single-site catalyzed) ethylene/alpha-olefin copolymer, ethylene/vinyl acetate copolymer, ethylene/methyl acrylate copolymer, ethylene/propylene copolymer, polybutylene homopolymer or copolymer, and mixtures thereof, as well as other similar materials that are capable of forming a heat-seal. For example, anhydride-grafted resins may also be included within the heat-seal layer 14 as known in the art.

Although providing dimensional stability to multilayered film constructions, monolayer films formed from the high modulus polymer compositions of the invention are generally characterized by elevated gas transmission levels. Consequently, multilayered films in accordance with the invention may include an optional oxygen barrier layer 16, particularly multilayered film constructions intended for non-respirative food packaging applications. The oxygen barrier layer 16, and therefore the multilayer film 10, advantageously provides an oxygen transmission rate (OTR) of less than or equal to 30 cc of oxygen per square meter of film per 24 hour period at 1 atmosphere and at a temperature of 73° F. (at 0% relative humidity). More preferably, oxygen barrier layer 16, and therefore film 10, has an OTR of less than 25 $cc/m^2$ per 24 hours at 1 atm., and more preferably less than 20, more preferably still less than 15, even more preferably less than 10, such as less than 8, less than 7, less than 6, or less than 1 $cc/m^2$ per 24 hours at 1 atm. (73° F. and 0% RH).

Examples of suitable materials for the oxygen barrier layer 16 include at least one member selected from ethylene/vinyl alcohol copolymer (EVOH), polyamides such as polyamide MXD6 and polyamide MXD6/MXDI, polyvinylidene chloride (PVDC), and polyacrylonitrile (PAN), including copolymers of PVDC and PAN. In one advantageous embodiment, the oxygen barrier layer 16 is formed from EVOH.

By virtue of the high modulus layer 12 containing cycloolefinic copolymer, the multilayer film 10 exhibits a storage modulus of greater than 15,000 pounds/in$^2$ at 120° C., such as a storage modulus of greater than 20,000 pounds/in$^2$ at 120° C. (storage modulus being determined in accordance with ASTM 5026-95a). Because of this relatively high storage modulus at temperatures up to 120° C., the multilayer film 10 has excellent high-temperature dimensional stability. More preferably, the multilayer film 10 has a storage modulus of greater than 40,000 pounds/in$^2$ at 120° C., such as a storage modulus of greater than 60,000 pounds/in$^2$ at 120° C.; 70,000 pounds/in$^2$ at 120 ° C. or 80,000 pounds/in$^2$ at 120° C.

Films formed in accordance with the invention may further contain printed indicia, such as labeling and the like. The multilayer film 10 may consequently further include one or more optional printable layers. Printable layers are advantageously formed from a polymer or polymer composition exhibiting a surface energy of at least 36 dynes/cm$^2$. Such a surface energy allows an image to be printed on the outer surface of the printable layer. The printable layer may be formed from one or more polymers selected from polyamides, polyesters, polycarbonates, polyurethanes, polyvinyl chloride and polyacrylates. Polyolefin surfaces, such as polypropylene surfaces, that have been modified by corona, plasma, flame treatment or acid etching such that the surface energy exceeds 36 dynes/cm$^2$ are also suitable for printing.

The printable layer may also be selected to provide abuse-resistance to the multilayer film. For example, the printable layer may be formed from a semi-crystalline polyamide, such as polyamide 6, to impart both printability and abuse resistance.

One or more separate abuse layers may be optionally included within the interior of the multilayer film. Exemplary polymers from which the abuse layer may be formed include polyamides, such as polyamide 6, polyesters, polycarbonates, polyurethanes, polyvinyl chloride, polyacrylates and mixtures thereof. Additional exemplary polymers from which the abuse layer may be formed include highly crosslinked polyolefins, such as highly crosslinked ethylene alpha-olefin copolymers.

The multilayer film may also include one or more optional anti-curl layers, whose purpose is to balance any curl that may be created by the high modulus layer 12. The anti-curl layer generally includes at least one material selected from high density polyethylene, low density polyethylene, linear low density polyethylene, polypropylene, polyamide, polycarbonate, and polyester. Anti-curl layers formed from high density polyethylene typically have sufficient crystallinity to balance the polymer of the high modulus layer 12 and also adhere well the to polymers used to form the heat-seal layer 14.

One or more optional tie layers may be included in the multilayer film to promote interply adhesion between polar and non-polar materials. For example, a tie layer may be included between polar materials such as nylon 6 or ethylene-vinyl alcohol copolymers and non-polar materials such as ethylene-butene copolymer, ethylene-hexene copolymer, ethylene-octene copolymer, high density polyethylene, and polypropylene. Exemplary polymers from which the tie layer may be formed include olefin polymers or copolymers having an anhydride functionality grafted thereon and/or copolymerized therewith and/or blended therewith. More specific exemplary polymers and copolymers for use in the tie layers include the following anhydride-grafted polymers: ethylene/1-butene copolymer, ethylene/1-hexene copolymer, ethylene/1-octene copolymer, high density polyethylene, ethylene/vinyl acetate copolymer, ethylene methylacrylate copolymer, polypropylene, and low density polyethylene.

The multilayer film may further include one or more optional coatable adhesive layers to promote interply adhesion between two pre-formed films. For example, a coatable adhesive layer may be beneficial in constructions including a biaxially oriented polyester or polyamide substrate film that is laminated to a multilayer sealant film. The coatable adhesive layer is typically formed from a polymer or polymer composition selected to provide an inter-laminar bond strength of at least 0.5 lb/inch between the two pre-formed films. Exemplary materials from which to form the adhesive layer includes polyurethanes and copolymers and mixtures thereof.

Any of the layers within the multilayer film may include additives as known in the art. For example, an effective amount of one or more amide waxes or metal salts of fatty acids, e.g. lithium stearate, calcium stearate or zinc stearate or amide waxes of the ethylenebis(stearoylamide) or stearoylamide type, may be included in the high modulus polymer composition. Small amounts of other additives such as slip or antiblock agents, pigments, processing aids and the like can also be included in the high modulus layer and/or remaining layers, as long as they do not materially affect the basic characteristics of the resulting film, e.g., by causing the storage modulus of the film to fall below 30,000 pounds/in$^2$ at 120° C. or by adversely affecting the inter-laminar bond-strength.

The multilayer film may be formed by any conventional or suitable method known for forming multi-layer polymeric structures. Exemplary methods by which to form the multilayer film include: coextrusion, extrusion coating, film lamination, vapor deposition coating, solvent coating, emulsion coating, or suspension coating. In advantageous embodiments, the multilayer film is coextruded. Suitable methods of coextrusion include any extrusion method employing a heated die, such as a T-die or annular die. As known in the art, multi-layer T-die methods are generally used to form wide web films. Annular dies are typically used to form tubular films, generally by inflation methods. The mechanical properties of the high modulus layer may be improved by stretching the film at an elevated temperature, such as a temperature 10 to 30° C. above its glass transition temperature. Such stretching is known to particularly improve the elongation at break of the high modulus layer. Coextruded wide web films may be unoriented, uniaxially oriented or biaxially oriented, as known in the art. Films formed by inflation methods are generally biaxially oriented.

The multilayer film may have any thickness known in the art. For example, the multilayer film thickness may range from 0.5 to 20 mils. In aspects of the invention directed to food packaging the multilayer film thickness may range from 1 to 12 mils, such as 2 to 8 mils. The high modulus layer generally forms from 3 to 90 weight percent of the multilayer film, such as 5 to 15 weight percent. The heat seal layer generally forms from 10 to 97 weight percent of the multilayer film.

The polymer compositions of the invention may be formed into any useful article. Exemplary articles include the multilayer films described in detail above, as well as monolayer films, molded products, pultruded products, composites and the like.

Aspect of the invention will now be illustrated by the following non-limiting examples.

Tensile modulus is an indication of stiffness of the film. Tensile modulus can also indicate the dimensional stability of a film, with higher modulus values indicating a more stable film. Acceptable modulus values for food packaging applications will vary depending on the packaging conditions and the packaging equipment. Tensile modulus values are determined for the examples based on ASTM D-3763 using Instron Corporation's Dynatup at 73° F.

The peak impact energy reflects the impact resistance of a film. Higher peak impact energies indicate a more impact resistant film. The minimum acceptable peak impact energy for food packaging applications will vary depending on the packaging conditions and the packaging equipment. Peak impact energies are determined for the examples from instrumented impact experiments based on ASTM D-3763 using an ITR-2000 at 73° F.

The haze value indicates the optical clarity of the film. Lower haze values indicate a clearer film. Haze may be generated either at the film surface or within the interior of the film. Hence the total haze exhibited by a film includes both surface haze and internal haze. Films exhibiting total and/or internal haze values of 10% per mil or less are considered to provide superior optical clarity. Total haze values are determined for the examples based on ASTM D-1003.

Storage modulus is an indication of film flexibility, with higher storage modulus values reflecting a more rigid film. Minimum acceptable storage modulus values will vary depending on the packaging conditions and the packaging equipment. Storage modulus is determined for the samples based on ASTM D-5026 using Rheometrics' RSA-II.

Total impact energy is another indication of the impact resistance of a film, with higher total impact energy values indicating more impact resistant films. The minimum acceptable total impact energy for food applications will vary depending on the packaging conditions and the packaging equipment. The total impact energy is determined for the samples based on ASTM D-3763.

EXAMPLES

Monolayer High Modulus Films:

A series of monolayer high modulus layer film samples are prepared from various combinations of different types and amounts of cycloolefinic polymers and elastomeric copolymers. The high modulus polymer compositions are initially prepared by compounding the various components in a Leistritz 18-mm compounding extruder with extrusion temperatures set at 210 to 225° C. The melt is then forced through a T-die that was attached to the compounding extruder. The melt is subsequently quenched on a chill roll set at 40° C. to form a monolayer film. Most of the resulting monolayer film samples are approximately 5 to 7 mils thick.

For Comparative Examples 1-7 and Examples 1-5, the cycloolefinic copolymer is a norbornene/ethylene copolymer exhibiting a glass transition temperature ("Tg") of 140° C., commercially available from Ticona under the trade name of TOPAS® 6013. For Comparative Example 8 and Examples 6-8, the cycloolefinic copolymer is an ethylene-norbornene copolymer with a Tg of 105° C. commercially available from Zeon Chemicals under the trade name ZEONOR® 1020. The SEBS resin containing 13 weight percent styrene is commercially available from Shell Chemical under the trade name of Kraton® G1657. The SEBS resin containing 29 weight percent styrene is commercially available from Shell Chemical under the trade name of Kraton® G1652. The SBS resin containing 29 weight percent styrene is commercially available from Dexco Polymers under the trade name of Vector 8508.

The various combinations and amounts of elastomeric copolymers within the cyclic olefin resins are provided in Table 1 for each of the samples, along with the resulting physical properties. The column labeled "EC Amt (wt % bohm)" sets forth the amount of elastomeric copolymer present in the composition, and the remainder of the composition is cycloolefinic copolymer.

TABLE 1

| Sample ID | EC[1] | Styrene Content (wt %, boec) | EC Amt (wt %, bohm) | Tensile Modulus (Kpsi) | Peak Energy (Joules) | Haze (%) |
|---|---|---|---|---|---|---|
| Comp Ex 1 | None | — | 0 | 363 | <0.01 | 5 |
| Comp Ex 2 | SEBS | 13 | 5 | 355 | 0.08 | 34 |
| Comp Ex 3 | SEBS | 13 | 10 | 289 | 0.21 | 53 |
| Comp Ex 4 | SEBS | 13 | 15 | 297 | 0.10 | 72 |
| Comp Ex 5 | SBS | 29 | 10 | 329 | 0.37 | 76 |
| Comp Ex 6 | SBS | 29 | 15 | 295 | 0.84 | 83 |
| Comp Ex 7 | SBS | 29 | 20 | 259 | 0.53 | 89 |
| Ex 1 | SEBS | 29 | 5 | 342 | 0.07 | 7 |
| Ex 2 | SEBS | 29 | 10 | 323 | 0.10 | 11 |
| Ex 3 | SEBS | 29 | 15 | 304 | 0.14 | 22 |
| Ex 4 | SEBS | 29 | 20 | 299 | 0.08 | 27 |
| Ex 5 | SEBS | 29 | 25 | 308 | 0.07 | 26 |
| Comp Ex 8 | None | — | 0 | 319 | 0.90 | 5 |
| Ex 6 | SEBS | 29 | 5 | 303 | 1.27 | 4 |
| Ex 7 | SEBS | 29 | 10 | 297 | 1.13 | 7 |
| Ex 8 | SEBS | 29 | 15 | 274 | 1.39 | 15 |

[1]EC = Elastomeric Component

As indicated by a comparison of Examples 1-5 with Comparative Examples 2-4 of Table 1, the styrene content of the elastomeric component significantly impacts the resulting optical properties. Although Comparative Examples 2-4 exhibit beneficial impact resistance, they suffer from inferior optical properties in comparison to Examples 1-5. The type of elastomeric copolymer also affects the resulting optical properties, as indicated by a comparison of Examples 1-5 and Comparatvie Examples 5-7. As shown by Comparative Examples 5-7, SBS may be used to impart adequate impact resistance to cycloolefinic polymers. However, SBS does not provide the beneficial optical properties of the elastomeric copolymers of the elastomeric copolymers of the invention.

Further, the data indicates that only a relatively small amount of elastomeric copolymer is required, such as an amount of from 5 to 10 weight percent, to impart improved impact resistance to polymer compositions retaining adequate modulus and optical properties. The results further indicate that increasing amounts of the elastomeric copolymer generally induce higher total haze values.

The actual numerical values for the haze for Comparative Examples 1-8 and Examples 1-8 are skewed upward, however, by the fact that these examples were of thicker high modulus film compositions than would be included within packaging films, particularly food packaging films. Further, a significant portion of the total haze values may have been due to the surface roughness of the monolayer films. Such surface roughness would be eliminated for embodiments in which the high modulus composition forms an internal layer of a multilayer film. Consequently, the monolayer samples indicate that the total haze of polymer compositions formed in accordance with the invention would provide beneficial total haze values within multilayered films.

Multilayer High Modulus Films (Examples 9-11 and Comparative Examples 9 and 10):

Multilayered films are also formed in accordance with the invention. The multilayered films are fully coextruded and produced by blown film coextrusion (with the exception of Comparative Example 9, described below). The films are formed using process conditions and equipment well known in the art of blown film extrusion.

The materials used to form the multilayered films of Examples 9-11 and Comparative Examples 9 and 10 are identified below.

Resins Used in the Examples
1. PA-1: Ultramid® B 35 polyamide 6 resin having a density of 1.14 g/cc (ASTM D1505) and a melting point of 220° C.; obtained from BASF of Mount Olive, N.J.
2. PA-2: Grivory G21 amorphous nylon with a glass transition temperature of 125° C. and a density of 1.18 g/cc (ASTM D1505); obtained from EMS of Sumter, S.C.
3. PA-3: Capron® B100WP nylon 6 resin having a density of 1.135 g/cc (ASTM D1505) and a melting point of 220° C.; purchased from Honeywell of Hopewell, Va.
4. PA-4: Ultramid® KR-4407 nylon 6 resin having a density of 1.14 g/cc (ASTM D1505) and a melting point of 220° C., containing less than 1% combined talc and silicon oil; purchased from BASF of Mount Olive, N.J.
5. EVOH: Soaranol ET ethylene/vinyl compound having 38% ethylene, a density of 1.17 g/cc (ASTM D1505) and a melt index of 3.2 (ASTM D1238); obtained from Nippon Goshei, supplied by Soarus of Arlington Heights, Ill.
6. TIE-1: Tymor® 1228B anhydride-grafted polyolefin resin having a melt index of 2.1 (ASTM D 1238) and a density of 0.921 g/cc (ASTM D1505); purchased from Rohm and Haas of Philadelphia, Pa.
7. TIE-2: Bynel® CXA 99E660 anhydride-grafted polyolefin in ethylene/vinyl acetate having a melt index of 2.4 (ASTM D1238) and a density of 0.943 g/cc (ASTM D1505); obtained from DuPont of Wilmington, Del.
8. ENB-1: TOPAS® 6013 cyclic ethylene norbornene copolymer with a melt index of 16 (ISO 1133) and a density of 1.02 (ISO 1183) purchased from Ticona of Summit, N.J.
9. ENB-2: TOPAS® 8007 cyclic ethylene norbornene copolymer with a melt index of 4.5 (ISO 1133), a density of 1.02 (ISO 1183), and a glass transition temperature of 85° C.; purchased from Ticona of Summit, N.J.
10. SEBS: Kraton® G1652 styrene ethylene butylene block terpolymer containing 29% styrene with a melt index of 4.4 (ASTM D 1238) and a density of 0.910 g/cc (ASTM D 1505); obtained from Shell of Belpre, Ohio.
11. EAO-1: SLX-9103 homogeneous ethylene-hexane-butene terpolymer having a melt index of 2.0 (ASTM D 1238) and density of 0.902 (ASTM D 1505); purchased from ExxonMobil of Houston, Tex.
12. EAO-2: EXCEED 361C33 homogenous ethylene-hexane-1 copolymer with a melt index of 4.5 g/min (ASTM D1238) and a density of 0.917 g/cc (ASTM D 1505) purchased from ExxonMobil of Houston, Tex.
13. MB-1: Grilon XE 3361 nylon 6 masterbatch containing 5% talcum (magnesium silicate), 5% calcium carbonate, and 5% n,n'-ethylene bis stearamide with density of 1.140 (ASTM D 1505) and a melting point of 220° C.; purchased from EMS of Sumter, S.C.
14. MB-2: FSU 255E low density polyethylene masterbatch containing 25% diatomaceous earth and 5% erucamide with a melt index of 8.0 (ASTM D 1238) and a density of 1.08 g/cc (ASTM D 1505); obtained from A. Schulman of Akron, Ohio.
15. MB-3: Clariant 1080864S nylon 6 masterbatch containing 20% diatomaceous earth and 10% erucamide with a density of 1.20 g/cc (ASTM D 1505) and a melting point of 220° C.; purchased from Clariant of Minneapolis, Minn.
16. MB-4: Ampacet 10853 linear low density polyethylene based masterbatch containing 19.4% diatomaceous earth with a melt index of 1.5 g/min (ASTM D 1238) and a density of 1.00 g/cc (ASTM D 1505); obtained from Ampacet of De Ridder, La.
17. LDPE: ESCORENE LD200.48 low density polyethylene with a melt index of 7.5 g/min (ASTM D 1238) and a density of 0.917 g/cc (ASTM D 1505); obtained from ExxonMobil of Houston, Tex.

All weight percentages noted within the various layers are weight percentage based on the weight of the given layer, unless specified to the contrary.

Example 9

An eight layer film in accordance with the present invention having the following structure is formed (total film thickness of from 4.1-4.2 mils):
Layer 1: 98% EAO-1+2% MB-2 (15% of total thickness of layers 1-8).
Layer 2: 60% ENB-1+40% SEBS (15% of total thickness of layers 1-8).
Layer 3: 100% TIE-1 (10% of total thickness of layers 1-8).
Layer 4: 80% PA-1+20% PA-2 (7% of total thickness of layers 1-8).
Layer 5: 100% EVOH (10% of total thickness of layers 1-8).
Layer 6: 80% PA-1+20% PA-2 (8% of total thickness of layers 1-8).
Layer 7: 100% TIE-1 (23% of total thickness of layers 1-8).
Layer 8: 83% PA-1+15% PA-2+2% MB-1 (12% of total thickness of layers 1-8).

Example 10

An eight layer film in accordance with the present invention having the following structure is formed (total film thickness of from 3.3-3.7 mils):
Layer 1: 98% EAO-1+2% MB-2 (15% of total thickness of layers 1-8).
Layer 2: 60% ENB-1+30% SEBS (15% of total thickness of layers 1-8).
Layer 3: 100% TIE-1 (10% of total thickness of layers 1-8).
Layer 4: 80% PA-1+20% PA-2 (7% of total thickness of layers 1-8).
Layer 5: 100% EVOH (10% of total thickness of layers 1-8).
Layer 6: 80% PA-1+20% PA-2 (8% of total thickness of layers 1-8).
Layer 7: 100% TIE-1 (23% of total thickness of layers 1-8).
Layer 8: 83% PA-1+15% PA-2+2% MB-1 (12% of total thickness of layers 1-8).

Example 11

An eight layer film in accordance with the present invention having the following structure is formed (total film thickness of from 4.1-4.6 mils):

Layer 1: 98% EAO-1+2% MB-2 (15% of total thickness of layers 1-8).
Layer 2: 60% ENB-1+20% SEBS (15% of total thickness of layers 1-8).
Layer 3: 100% TIE-1 (10% of total thickness of layers 1-8).
Layer 4: 80% PA-1+20% PA-2 (7% of total thickness of layers 1-8).
Layer 5: 100% EVOH (10% of total thickness of layers 1-8).
Layer 6: 80% PA-1+20% PA-2 (8% of total thickness of layers 1-8).
Layer 7: 100% TIE-1 (23% of total thickness of layers 1-8).
Layer 8: 83% PA-1+15% PA-2+2% MB-1 (12% of total thickness of layers 1-8).

Comparative Example 9

An eight layer cast film in accordance with the present invention is extruded through an annular die followed by a water quench to form the following structure (total film thickness of from 4.1-4.2 mils):

Layer 1: 20% ENB-2+1.6% MB-4+8% LDPE+70.6% EAO-2 (8% of total thickness of layers 1-8).
Layer 2: 100% ENB-1 (25% of total thickness of layers 1-8).
Layer 3: 100% TIE-1 (8% of total thickness of layers 1-8).
Layer 4: 80% PA-3+20% PA-2 (6.5% of total thickness of layers 1-8).
Layer 5: 100% EVOH (8% of total thickness of layers 1-8).
Layer 6: 80% PA-3+20% PA-2 (6.5% of total thickness of layers 1-8).
Layer 7: 100% TIE-2 (25% of total thickness of layers 1-8).
Layer 8: 96% PA-4+2% MB-3+2% MB-1 (13% of total thickness of layers 1-8).

Comparative Example 10

Layer 1: 98% EAO-1+2% MB-2 (15% of total thickness of layers 1-8).
Layer 2: 100% TIE-1 (25% of total thickness of layers 1-8).
Layer 3: 80% PA-1+20% PA-2 (7% of total thickness of layers 1-8).
Layer 4: 100% EVOH (10% of total thickness of layers 1-8).
Layer 5: 80% PA-1+20% PA-2 (8% of total thickness of layers 1-8).
Layer 6: 100% TIE-1 (23% of total thickness of layers 1-8).
Layer 7: 83% PA-1+15% PA-2+2% MB-1 (12% of total thickness of layers 1-8).

TABLE 2

Impact Test Results

|  | Ex. 9 | Ex. 10 | Ex. 11 | Comp. Ex. 10 |
|---|---|---|---|---|
| Room Temperature (73° F.) Conditions | | | | |
| Sample thickness (mil) | 4.1 | 3.5 | 4.6 | 3.6 |
| Max Load (lb) | 23.5 | 20.1 | 25.5 | 9.9 |
| Energy to Max Load (ft-lb) | 0.59 | 0.44 | 0.53 | 0.08 |
| Total Energy (ft-lb) | 0.65 | 0.50 | 0.68 | 0.09 |
| Deflect. At Max Load (in) | 0.57 | 0.52 | 0.51 | 0.25 |
| Failure Mode | Broke | Broke | Broke | Shattered |
| Refrigerated (41° F.) Conditions | | | | |
| Sample thickness (mil) | 4.2 | 3.3 | 4.3 | 3.6 |
| Max Load (lb) | 20.8 | 21.8 | 23.8 | 11.9 |
| Energy to Max Load (ft-lb) | 0.34 | 0.40 | 0.31 | 0.09 |
| Total Energy (ft-lb) | 0.47 | 0.50 | 0.55 | 0.10 |
| Deflect. At Max Load (ft-lb) | 0.43 | 0.47 | 0.38 | 0.25 |
| Failure Mode | Broke | Broke | Broke | Shattered |
| Frozen (32° F.) Conditions | | | | |
| Sample Thickness (mil) | 4.2 | 3.7 | 4.1 | 3.5 |
| Max Load (lb) | 23.6 | 23.1 | 21.4 | 11.9 |
| Energy to Max Load (ft-lb) | 0.39 | 0.37 | 0.26 | 0.09 |
| Total Energy (ft-lb) | 0.54 | 0.50 | 0.44 | 0.10 |
| Deflect. At Max Load (in.) | 0.43 | 0.43 | 0.36 | 0.25 |
| Failure Mode | Broke | Broke | Broke | Shattered |

As indicated by a comparison of Examples 9-11 with Comparative Example 10, the maximum load, energy to maximum load, total energy, deflection at maximum load and failure mode are all improved by the addition of the elastomeric components of the invention. These properties are also improved over a range of temperatures, including room temperature, refrigerated, and frozen conditions.

The storage modulus of Examples 9-11 is determined at temperatures of from 60° C. to 160° C. A plot of the storage modulus values for Examples 9-11 is provided in FIG. 2, along with comparative plots of a nylon laminate, a polyethylene terephthalate laminate, and Comparative Example 10, a seven layer film comparable to Example 9 without the COC resin.

Figure 2:
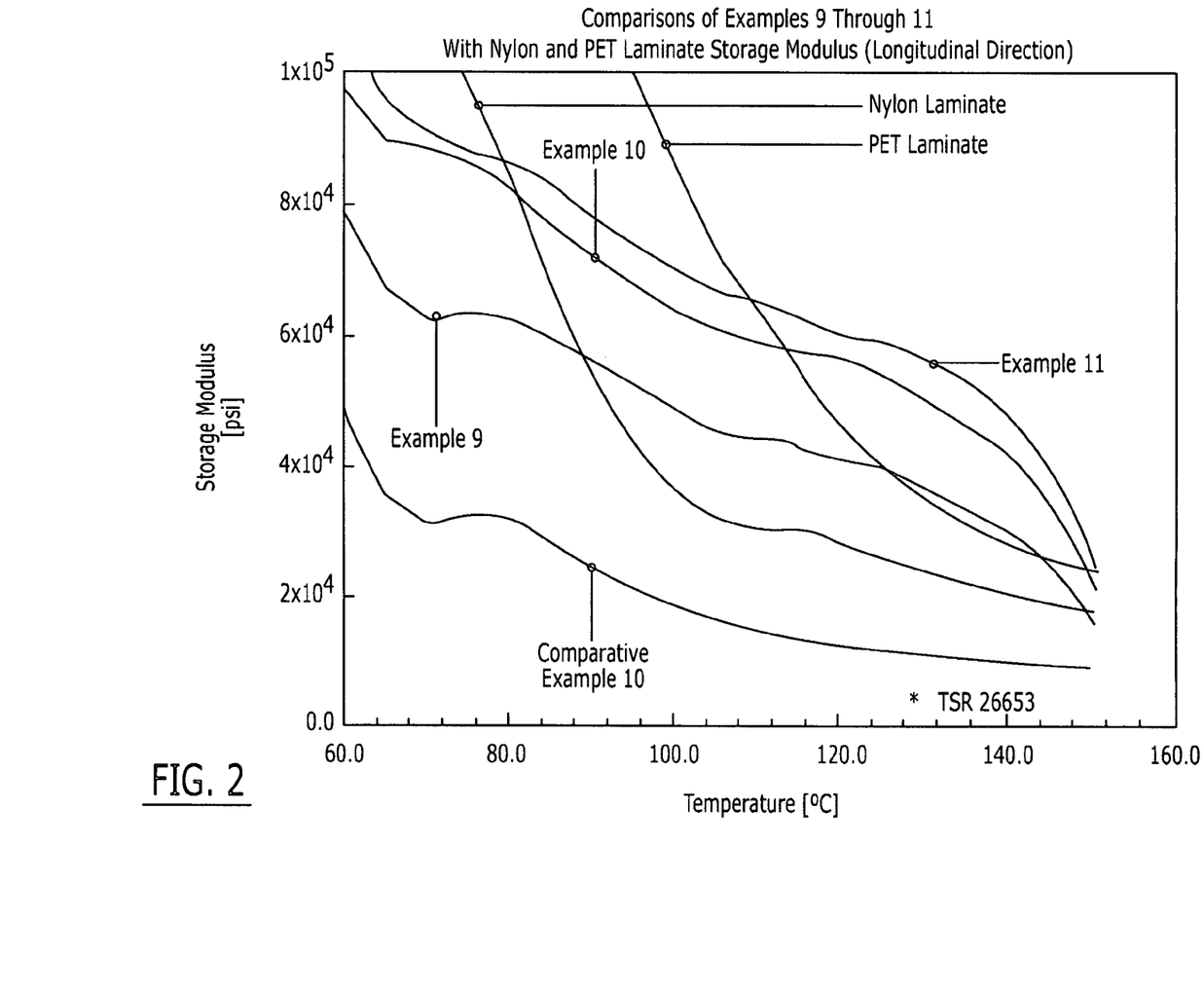
FIG. 2 graphically illustrates the storage modulus over a range of temperatures for three films in accordance with the invention.

As shown in FIG. 2, the high modulus polymer compositions of the invention significantly improve the storage modulus of the resulting film. At elevated temperatures, such as temperatures of from 110 to 150° C., films formed in accordance with the invention provide superior storage modulus performance in comparison to conventional PET and nylon laminates.

Figure 3:
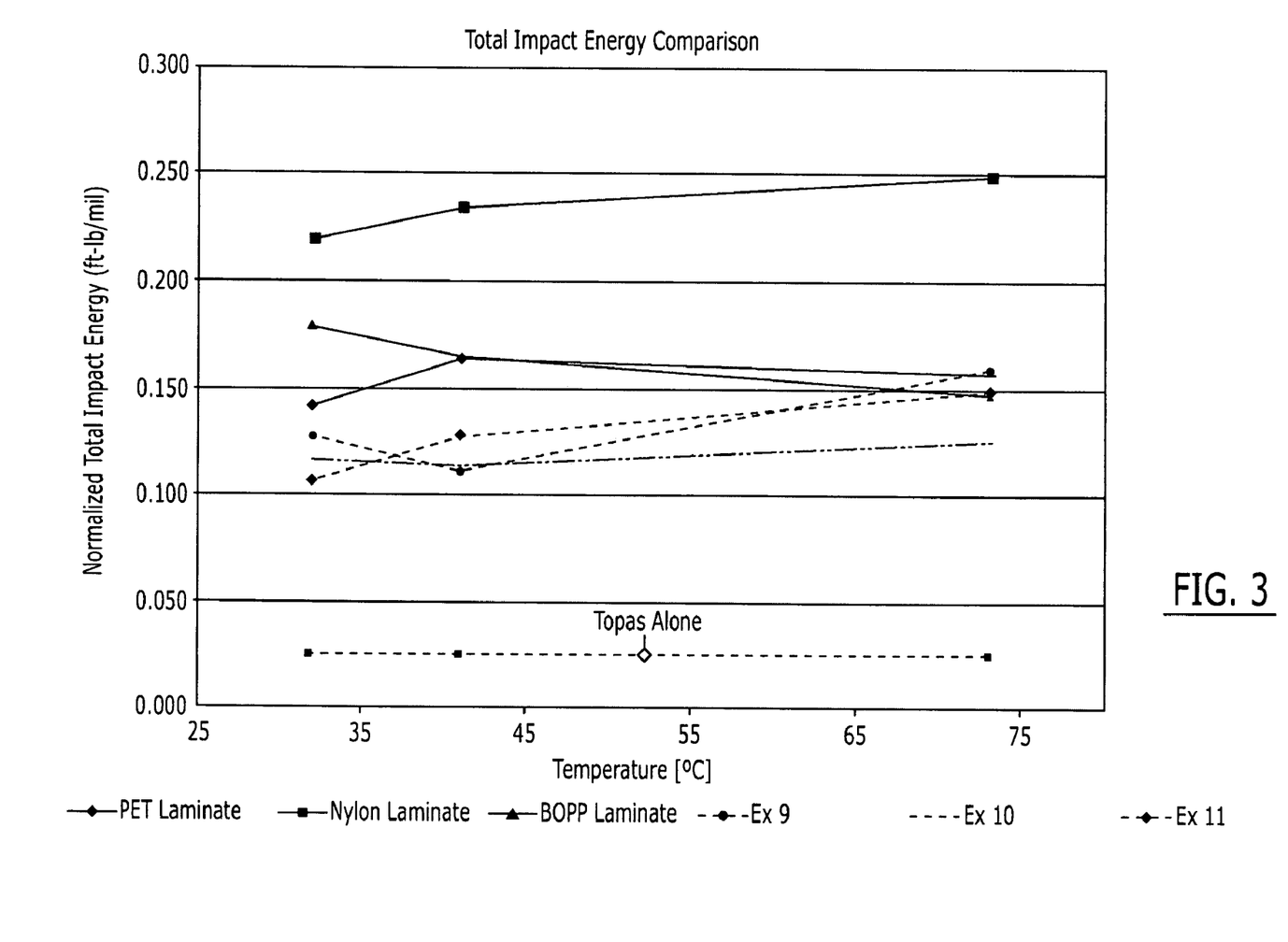
FIG. 3 graphically illustrates the total impact energy over a range of temperatures for three films in accordance with the invention.

FIG. 3 illustrates the total impact energy of the films of Examples 9-11 and in comparison to PET, nylon, and biaxially oriented polypropylene laminates. As shown, the elastomeric copolymers of the invention provide a significant increase in total impact energy in comparison to COC alone. Films of the invention further provide acceptable impact performance over a range of temperatures, e.g. temperatures of from 35 to 75° C.

Multilayer High Modulus Films (Examples 12-15 and Comparative Example 11):

An additional series of multilayered films are also formed in accordance with the invention. The multilayered films are fully coextruded and produced by a cast coextrusion process using a slot die, followed by a water quench upon exiting the die. The films are formed using process conditions and equipment well known in the art of cast film extrusion.

Examples 12-15 and Comparative Example 11 include a cycloolefinic copolymer resin, which is a norbornene/ethylene copolymer with a glass transition temperature of 160° C., commercially available from Ticona under the trade name TOPAS® 6015. Examples 12-15 include an elastomeric copolymer, which is a styrene ethylene butadiene resin containing 29 weight % styrene, commercially available from Asahi Chemicals under the trade name Tuftec 1053. Comparative Example 11 includes a linear low density polyethylene resin, commercially available from ExxonMobil under the trade name Exceed 4518 PA.

The materials used to form the multilayered films of Examples 12-15 and Comparative Example 11 are identified below.

Resins Used in the Examples

1. MB-4: Clariant 1080864S nylon 6 masterbatch containing 20% diatomaceous earth and 10% erucamide with a density of 1.20 g/cc (ASTM D 1505) and a melting point of 220° C., available from Clariant of Minneapolis, Minn.
2. PA6-1: Capron® B100WP nylon 6 resin having a density of 1.135 g/cc (ASTM D1505) and a melting point of 220° C., available from Honeywell of Hopewell, Va.
3. PA6-2: Ultramid® KR-4407 nylon 6 resin having a density of 1.14 g/cc (ASTM D1505) and a melting point of 220° C., containing less than 1% combined talc and silicon oil, available from BASF of Mount Olive, N.J.
4. MB-1: Grilon XE 3361 nylon 6 masterbatch containing 5% talcum (magnesium silicate), 5% calcium carbonate, and 5% n,n'-ethylene bis stearamide with density of 1.140 (ASTM D 1505) and a melting point of 220° C., available from EMS of Sumter, S.C.
5. TIE-4: PX2049 anhydride-grafted high density polyethylene resin having a melt index of 4.7 g/10 min. (ASTM D 1238) and a density of 0.955 g/cc (ASTM D 1505), available from Equistar Chemicals of Houston, Tex.
6. MB-3: Ampacet 10853 linear low density polyethylene based masterbatch containing 19.4% diatomaceous earth with a melt index of 1.5 g/min (ASTM D 1238) and a density of 1.00 g/cc (ASTM D 1505), available from Ampacet of De Ridder, La.
7. EVOH-3: Soaranol ET 3803 ethylene/vinyl alcohol copolymer having 38% ethylene, a density of 1.17 g/cc (ASTM D1505) and a melt index of 2.9-3.5 g/10 min. (ASTM D 1238), available from Nippon Goshei; supplied by Soarus of Arlington Heights, Ill.
8. EVA-2: Elvax® 3174 SHB ethylene vinyl acetate copolymer having 18% vinyl acetate and including inorganic antiblock and organic slip additives, having a melting point of 185° F., available from DuPont of Wilmington, Del.
9. EVA-1: Elvax® 3174 ethylene vinyl acetate copolymer having 18% vinyl acetate, having a melting point of 185° F., available from DuPont of Wilmington, Del.
10. HEAO-1: EXCEED 4518 PA linear homogenous ethylene-hexene-1 copolymer with a melt index of 4.5 g/10 min. (ASTM D 1238) and a density of 0.918 g/cc (ASTM D 1505), available from ExxonMobil of Houston, Tex.
11. HEAO-2: EXACT® 3035 linear homogenous ethylene-hexene copolymer with a melt index of 3.5 g/10 min. (ASTM D 1238) and a density of 0.900 g/cc (ASTM D 1505), available from ExxonMobil of Houston, Tex.
12. SB-1: Tuftec 1053 styrene ethylene butadiene copolymer containing 29% styrene with a specific gravity of 0.91, available from Asahi Chemical.
13. COC-3: TOPAS® 6015 cyclic ethylene norbornene copolymer with a glass transition temperature (Tg) of 160° C., available from Ticona of Summit, N.J.
14. TIE-1: PX3236 anhydride-grafted linear low density polyethylene resin having a melt index of 2 g/10 min. (ASTM D 1238) and a density of 0.921 g/cc (ASTM D 1505), available from Equistar Chemicals of Houston, Tex.

All weight percentages noted within the various layers are weight percentage based on the weight of the given layer, unless specified to the contrary.

Example 12

An eight layer film in accordance with the present invention having the following structure is formed (total film thickness of 2.2 mils):
Layer 1: 94% EVA-1+6% MB-3 (23% of total thickness of layers 1-8).
Layer 2: 80% COC-3+20% SB-1 (36% of total thickness of layers 1-8).
Layer 3: 100% TIE-4 (6.4% of total thickness of layers 1-8).
Layer 4: 100% PA6-1 (6.4% of total thickness of layers 1-8).
Layer 5: 100% EVOH-3 (9.0% of total thickness of layers 1-8).
Layer 6: 100% PA6-1 (6.4% of total thickness of layers 1-8).
Layer 7: 100% TIE-4 (6.4% of total thickness of layers 1-8).
Layer 8: 96% PA-2+2% MB-1+2% MB-4 (6.4% of total thickness of layers 1-8).

Example 13

An eight layer film in accordance with the present invention having the following structure is formed (total film thickness of 2.2 mils):
Layer 1: 94% EVA-2+6% MB-3 (23% of total thickness of layers 1-8).
Layer 2: 80% COC-3+20% SB-1 (36% of total thickness of layers 1-8).
Layer 3: 100% TIE-4 (6.4% of total thickness of layers 1-8).
Layer 4: 100% PA6-1 (6.4% of total thickness of layers 1-8).
Layer 5: 100% EVOH-3 (9.0% of total thickness of layers 1-8).
Layer 6: 100% PA6-1 (6.4% of total thickness of layers 1-8).
Layer 7: 100% TIE-4 (6.4% of total thickness of layers 1-8).
Layer 8: 96% PA-2+2% MB-1+2% MB-4 (6.4% of total thickness of layers 1-8).

Example 14

An eight layer film in accordance with the present invention having the following structure is formed (total film thickness of 2.2 mils):
Layer 1: 94% HEAO-2+6% MB-3 (23% of total thickness of layers 1-8).
Layer 2: 80% COC-3+20% SB-1 (36% of total thickness of layers 1-8).
Layer 3: 100% TIE-4 (6.4% of total thickness of layers 1-8).

Layer 4: 100% PA6-1 (6.4% of total thickness of layers 1-8).
Layer 5: 100% EVOH-3 (9.0% of total thickness of layers 1-8).
Layer 6: 100% PA6-1 (6.4% of total thickness of layers 1-8).
Layer 7: 100% TIE-4 (6.4% of total thickness of layers 1-8).
Layer 8: 96% PA-2+2% MB-1+2% MB-4 (6.4% of total thickness of layers 1-8).

Example 15

An eight layer nonbarrier film in accordance with the present invention having the following structure is formed (total film thickness of 2.2 mils):
Layer 1: 94% EVA-1+6% MB-3 (23% of total thickness of layers 1-8).
Layer 2: 80% COC-3+20% SB-1 (36% of total thickness of layers 1-8).
Layer 3: 100% TIE-4 (6.4% of total thickness of layers 1-8).
Layer 4: 100% PA6-1 (6.4% of total thickness of layers 1-8).
Layer 5: 100% TIE-1 (9.0% of total thickness of layers 1-8).
Layer 6: 100% PA6-1 (6.4% of total thickness of layers 1-8).
Layer 7: 100% TIE-4 (6.4% of total thickness of layers 1-8).
Layer 8: 96% PA-2+2% MB-1+2% MB-4 (6.4% of total thickness of layers 1-8).

Comparative Example 11

A comparative eight layer film having the following structure is formed, which is similar to the structure of Example 12, except that Layer 2 of Example 12 is replaced with a blend of ethylene norbornene copolymer and LLDPE, as noted below (total film thickness of 2.2 mils):
Layer 1: 94% EVA-1+6% MB-3 (23% of total thickness of layers 1-8).
Layer 2: 60% COC-3+40% HEAO-1 (36% of total thickness of layers 1-8).
Layer 3: 100% TIE-4 (6.4% of total thickness of layers 1-8).
Layer 4: 100% PA6-1 (6.4% of total thickness of layers 1-8).
Layer 5: 100% EVOH-3 (9.0% of total thickness of layers 1-8).
Layer 6: 100% PA6-1 (6.4% of total thickness of layers 1-8).
Layer 7: 100% TIE-4 (6.4% of total thickness of layers 1-8).
Layer 8: 96% PA-2+2% MB-1+2% MB-4 (6.4% of total thickness of layers 1-8).

The multilayer film of Example 12 and Comparative Example 11 are analyzed for various physical properties, and the results are set forth below in Table 3.

TABLE 3

| Sample | Peak Load, N | Energy to Break, J | % Haze | % Clarity | % Gloss |
| --- | --- | --- | --- | --- | --- |
| Example 12 (invention) | 50.4 | 0.37 | 13.2 | 7.1 | 65 |
| Comparative Example 11 | 35.0 | 0.06 | 15.8 | 0.8 | 59 |

As discussed above, cycloolefinic copolymers useful in the invention can generally exhibit a glass transition temperature (Tg) ranging from 70 to 200° C. For various applications, such as those requiring good dimensional stability at elevated temperatures, cycloolefinic copolymers having a higher glass transition temperature can be particularly useful.

As a non-limiting example, cycloolefinic copolymers having a Tg of 140° C. and higher, for example about 160° C. and higher, can be beneficial in various packaging applications. Films including cycloolefinic copolymers with a higher Tg as a component thereof can, for example, exhibit the added benefit of extending sealing temperature range. A package that includes a cycloolefinic copolymer with a higher Tg as a component thereof can be sealed at a higher temperature, as compared to the same package including a cycloolefinic copolymer with a lower Tg as a component. As a result, increased thermal energy can be applied to the film during sealing with minimal or essentially no adverse affects, such as film elongation or stretching, rupture and the like. This in turn can reduce distortion of the package, including distortion of product labeling which can be present on the film component.

Horizontal and vertical form-fill-seal processes (HFFS and VFFS, respectively) are particularly rigorous food packaging applications. Such processes, as discussed above, include a heat sealing step to seal film stock together to form an integral package. If the film stock does not exhibit sufficient dimensional stability at elevated temperatures, the package can stretch or elongate and distort the resultant package, as well as printed indicia that can be present as a part of the film component. The film layers can even pull apart from one another, causing the process to be defective or even fail. Difficulties associated with such sealing processes can be further exacerbated because the processes often include drawing a vacuum around the product to be packaged, thereby placing sealing films under tension during sealing.

The use of a higher Tg material of the present invention in HFFS and VFFS processes can improve the dimensional stability of the film component. This in turn can minimize and even eliminate film distortion during sealing, thus reducing package and/or printing distortion in the final product. The higher Tg materials can also expand the sealing temperatures that can be used in packaging applications so that higher sealing temperatures can be used with minimal or no film distortion.

The higher Tg materials can be beneficial in other applications as well. Film dimensional stability can be important, for example, in vacuum skin packaging processes. In vacuum skin packaging processes, a lidding film is heated and the entire lidding film is placed (or draped) over the product to be packaged, such as bacon, while hot. If the product has a protrusion (such as bone), the film should exhibit sufficient dimensional stability during the draping process to minimize or eliminate forming a defective package. The use of a material with a higher Tg can assist in such applications. As another example, the use of higher Tg materials can improve dimensional stability of lidding stock for semi-rigid and rigid containers. The higher Tg material can minimize stretching during sealing so that the film does not distort.

In yet another example, the higher Tg materials can be useful in film printing processes. The higher Tg materials resist stretching, necking and other types of deformation at elevated temperatures used in printing processes. As a result the higher Tg materials can impart improved dimensional stability to the film, thereby allowing maintenance of color-to-color registration on the printing press, as well as overall consistency of the "repeat length" of each printed image.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A polymer composition comprising
   (a) at least one cycloolefinic polymer comprising at least one cyclic olefin mer and at least one acyclic olefin mer, and
   (b) at least one non-halogenated elastomeric copolymer comprising at least one aromatic vinyl mer and at least one saturated alkene mer, said elastomeric copolymer having an aromatic vinyl content of from 20 to 35 weight percent based on the weight of the elastomeric copolymer,
   wherein said polymer composition exhibits a haze value of 10% or less and a peak impact energy of 0.05 joules or greater, and wherein said cycloolefinic polymer and said elastomeric copolymer exhibit a difference in refractive index of at least 0.03.

2. A polymer composition according to claim 1, wherein said cyclic olefin mer comprises mer units derived from at least one monomer selected from the group consisting of norbornene, tetracyclododecene, bicyclo[2,2,1]hept-2-ene, 1-methylbicyclo[2,2,1]hept-2-ene, hexacyclo [6,6,1,1$^{3,6}$, 1$^{10,13}$,0$^{2,7}$,0$^{9,14}$]-4-heptadecene.

3. A polymer composition according to claim 1, wherein said acyclic olefin mer comprises mer units derived from at least one monomer selected from the group consisting of ethylene and propylene.

4. A polymer composition according to claim 1, wherein said cycloolefinic polymer comprises a copolymer of norbornene and ethylene.

5. A polymer composition according to claim 1, wherein said aromatic vinyl mer comprises mer units derived from at least one monomer selected from the group consisting of styrene, vinyl toluene and t-butyl styrene.

6. A polymer composition according to claim 1, wherein said saturated alkene comprises mer units derived from at least one monomer selected from the group consisting of ethylene, propylene, and butylene.

7. A polymer composition according to claim 1, wherein said elastomeric copolymer comprises at least one member selected from the group consisting of styrene-ethylene-butylene-styrene and styrene-ethylene-propylene-styrene.

8. A polymer composition according to claim 1, wherein said elastomeric copolymer comprises styrene-ethylene-butylene-styrene.

9. A polymer composition according to claim 1, wherein said polymer composition comprises elastomeric copolymer in an amount of from 2 to 75 weight percent, based on the weight of the polymer composition.

10. A polymer composition according to claim 1, wherein said polymer composition comprises elastomeric copolymer in an amount of from 10 to 50 weight percent, based on the weight of the polymer composition.

11. A polymer composition according to claim 1, wherein said polymer composition exhibits a haze value of 10% or less and a peak impact energy of 0.07 or greater.

12. A polymer composition according to claim 1, wherein said at least one cycloolefinic polymer has a glass transition temperature ranging from 70 to 200° C.

13. A polymer composition according to claim 1, wherein said at least one cycloolefinic polymer has a glass transition temperature ranging from 100 to 180° C.

* * * * *

UNITED STATES PATENT AND TRADEMARK OFFICE
CERTIFICATE OF CORRECTION

| | | |
|---|---|---|
| PATENT NO. | : 7,365,130 B2 | Page 1 of 1 |
| APPLICATION NO. | : 10/766753 | |
| DATED | : April 29, 2008 | |
| INVENTOR(S) | : Rivett et al. | |

It is certified that error appears in the above-identified patent and that said Letters Patent is hereby corrected as shown below:

Column 22,

Lines 8 and 9, "norbomene" should read --norbornene--.

Signed and Sealed this

Fifteenth Day of July, 2008

JON W. DUDAS
*Director of the United States Patent and Trademark Office*